Oct. 20, 1970 F. A. BROOKS 3,535,455

ANALOG VOICE SIGNAL PROCESSING IN TRANSMISSION CIRCUITS

Filed Oct. 18, 1968 3 Sheets-Sheet 1

INVENTOR.
FRED A. BROOKS
BY Harry A. Herbert Jr. and George Fine
ATTORNEYS

INVENTOR.
FRED A. BROOKS
BY Harry A. Herbert Jr. and George Fine
ATTORNEYS

INVENTOR.
FRED A. BROOKS
BY Harry A. Herbert Jr. and George Fine
ATTORNEYS 3,535,455

ANALOG VOICE SIGNAL PROCESSING IN TRANSMISSION CIRCUITS

Fred A. Brooks, 5 Emerson Gardens, Lexington, Mass. 02173

Filed Oct. 18, 1968, Ser. No. 768,626
H04b 3/04
U.S. Cl. 179—1 5 Claims

ABSTRACT OF THE DISCLOSURE

A system of analog voice processing in long haul transmission circuits wherein extended and controllable compression and expansion ratios are used to obtain a uniform signal from a universe of talker volumes for application to the transmission medium to improve the signal to noise ratio in the transmission channel with the extended and controllable compression ratios being used to control the overall net loss of transmission circuits to deliver preferred listening volumes to the user and reduce the net loss required to obtain the necessary stability margin in two-wire-four-wire circuits.

BACKGROUND OF THE INVENTION

This invention relates to a communication transmission system and more particularly to the analog voice signal processing in long haul transmission circuits.

Long distance communication systems have been designed to transmit the full range of talker power generated in response to sound pressures applied to the telephone transducer at the reading telephone. Variations in the telephone set power output from talker to talker cover a range of about 30 db. In addition to the wide range of power applied from different talkers must be added the power required to represent the desired signal information for either extreme volume.

If the minimum power talker is transmitted at a sufficiently high voltage to satisfactorily override the inherent circuit noise, the higher power talkers will be transmitted and be received with a much better signal to noise ratio than required. If the power available to carry the higher power talker were reduced and the power of the low volume talkers increased, the available power would be used more effectively to raise the signal to noise of low volume talkers and give more uniform performance for all talker volumes.

The present invention makes it possible to regulate the signal volumes generated in telephone set transducers in response to the applied sound pressure to a constant volume or as desired volume without undue signal distortion for application to a transmission medium. It further applies optimum compression and expansion desired to regulate for transmission variations in the transmission mediums. It also reduces the net loss required in two-wire-four-wire circuits to obtain the necessary stability margin.

In the prior art, standard telephone practice included the utilization of compressors and expanders, but with significantly less compression than is contemplated in this invention. The amount of compression and expansion used in these prior art devices have been limited by the control elements, or the mismatch of the response when the units were used at the ends of an unstable transmission medium.

The utilization of this invention in a worldwide communication system makes it possible to meet worldwide circuit objectives of analog voice transmission facilities which present systems fail to meet. It also reduces the amplitude variations required in PCM systems to meet signal to noise requirements and minimize the number of bits required to reproduce voice quality PCM signals. It still further reduces the bandwidth required to transmit voice signals by PCM codes.

SUMMARY OF THE INVENTION

A compressor is introduced in voice circuits to regulate or adjust the volume applied to approximately a constant volume in such a way that the stability margins in two-wire-four-wire and return loss in four-wire circuits are not impaired but enhanced. The volume of all talkers above a lineup volume is regulated by introducing loss as the applied volume of the talker increases, the transmission losses from end to end are regulated by means of transmitting compressors and a receiving compressor and expander. Extended and controllable compression and expansion ratios are used to obtain a uniform signal from a universe of talker volumes for application to the transmission medium to improve the signal to noise ratio in the transmission channel. The extended and controllable compression ratios are used to control the overall net loss of the transmission circuits to deliver preferred listening volumes to the user and reduce the net loss required to obtain the necessary stability margin in two-wire-four-wire circuits. Compressors make it possible to reduce the level difference between circuits to reduce crosstalk and also to reduce the level difference between channels operating over a common carrier system to reduce cross-modulation between channels of the system and within the channel.

An object of the present invention is to provide improved means of compressing or reducing the volume range of analog voice signals in communication systems.

Another object of the invention is to utilize more flexible compression and expansion ratios to improve the signal to noise and return loss performance of analog voice transmission circuits which accept and transmit a wide range of signals generated in telephone transducers from a universe of sound pressures.

A further object of this invention is to improve the transmission stability and to eliminate the requirement for a receiving expander to hold the net loss nearly constant.

A still further object of the present invention is to provide a system of analog voice signal processing in long haul transmission circuits utilizing improved compressors and expanders to permit regulation of a larger proportion of telephone users to constant volume to improve the transmission performance.

The features of this invention, which are believed to be new, are set forth with particularity in the appended claims. The invention itself, however, together with further objects and advantages thereof, may best be understood by reference to the following description when taken in conjunction with the accompanying drawings.

BRIEF DECRIPTION OF THE DRAWINGS

DESCRIPTION OF THE PREFERRED EMBODIMENTS

There are two general classes of local voice frequency transmission circuits used to connect local telephone sets to local offices and long distance four-wire facilities. The first, and most commonly used, are known as two-wire loop circuits. The single two-wire loop circuit is divided into separate one way transmitting and receiving circuits at a telephone office for transmission to and from a distant office. The second type or four-wire loop circuits are just now being introduced into military systems, to connect the local subscriber loops to the telephone office by extending the four-wire circuit to the local telephone. These circuits are isolated from each other from end to end except in the handset where the principle coupling is between the receiver and the transmitting tranducer.

Figure 1:
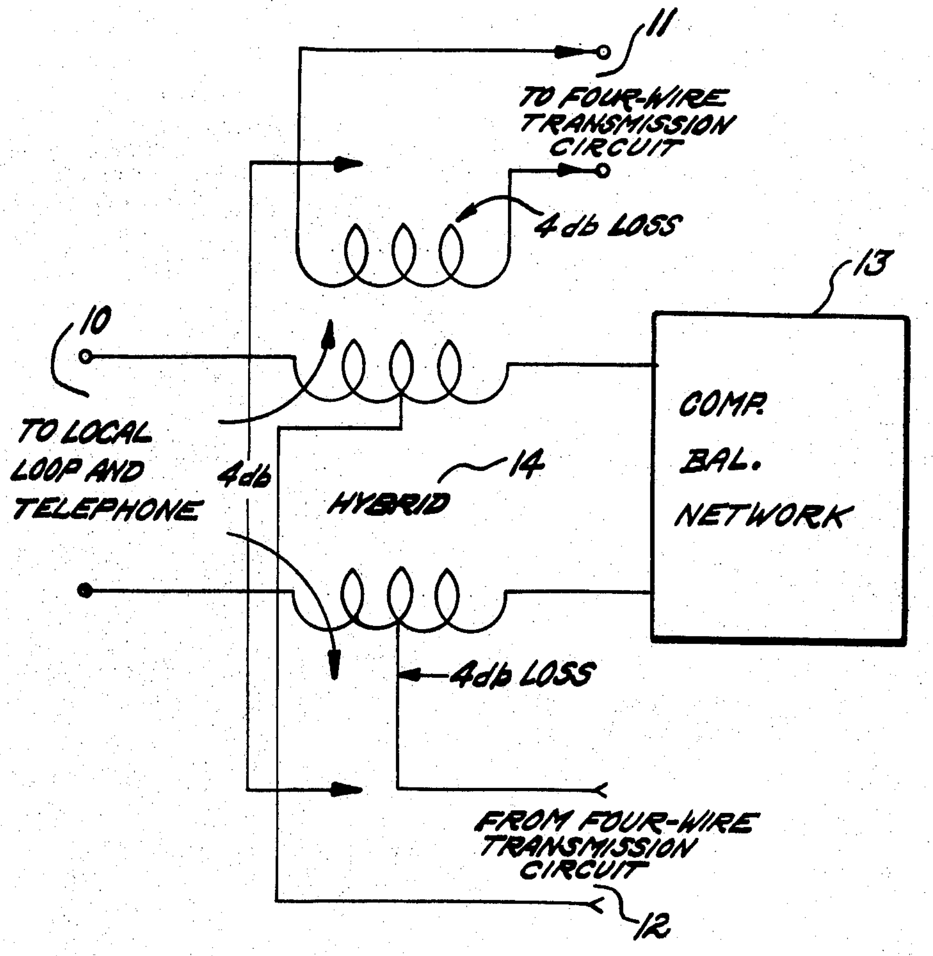
FIG. 1 illustrates a circuit indicating transmission loss of two-wire-four-wire hybrid circuits with circuit losses minimum.

A two-wire pair of conductors is used with a two-wire telephone set to connect the telephone to the local telephone office for interconnection to four-wire long distance circuits or other two-wire trunks. A hybrid coil or equivalent bridge circuit is used at the local office to convert the single circuit to a pair of circuits, one for each direction. The hybrid coil is provided with a balancing network to separate the single bidirectional circuit into two unidirectional circuits. Now referring to FIG. 1, in determining the loss from one unidirection four-wire circuit to the other, the balance at the hybrid 14 in the two-wire circuit input is assumed to be zero, to give a 4 db minimum loss between the two four-wire circuits connected to the hybrid 14. The loss from the two-wire input circuit 10 to either of the four-wire transmission circuits 11 or 12 is shown as 4 db, assuming no energy loss into the compromise balance network 13.

Figure 2:
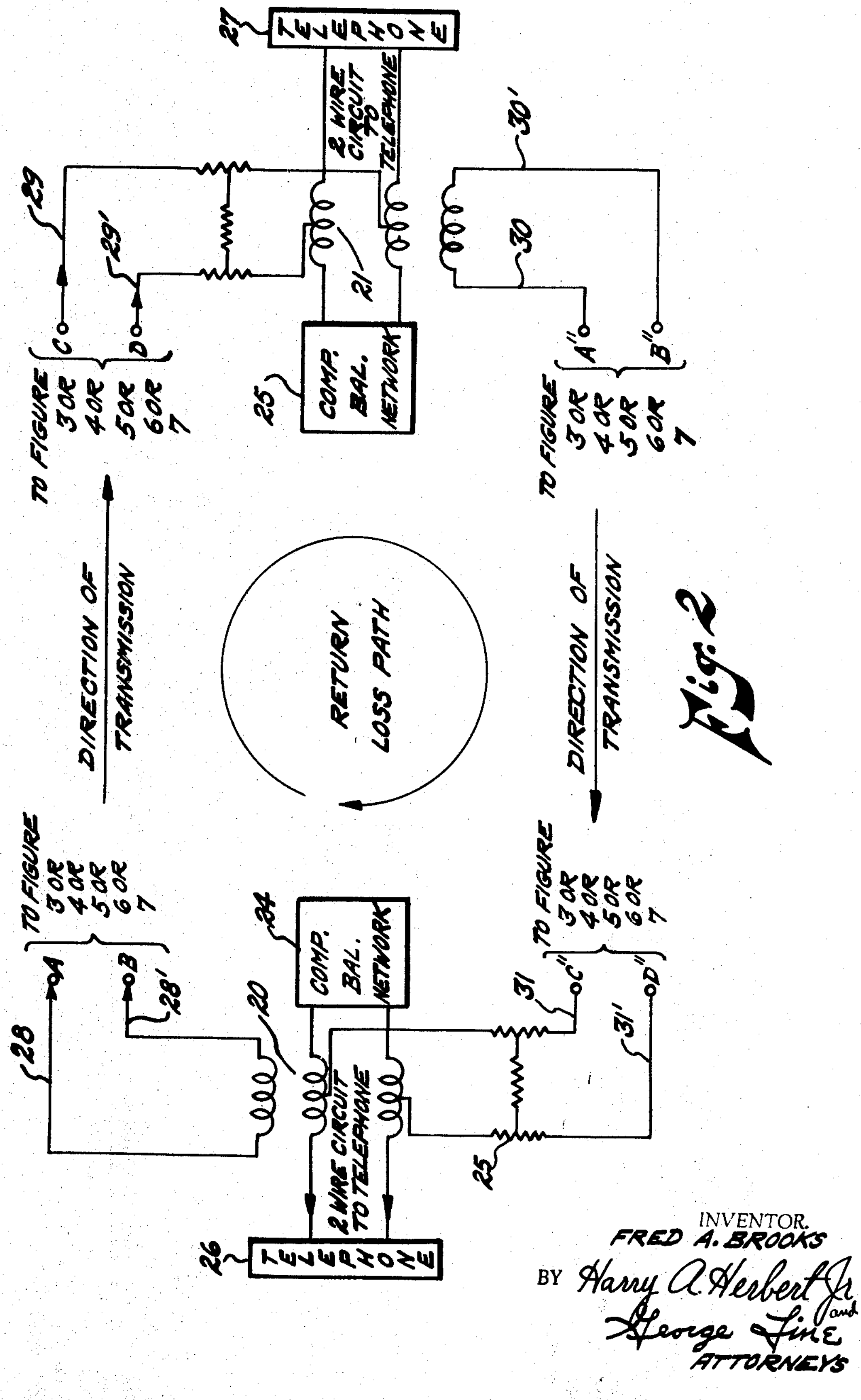
FIG. 2 illustrates a two-wire-four-wire transmission circuit.

A transmission block schematic of an analog two-wire-four-wire transmission circuit is shown in FIG. 2. The schematic shows a connection to one of several possible unidirectional transmission circuits as shown in FIGS. 3–6 in either direction. The sum of the losses and gains around the closed path (return loss path) must not exceed some minimum loss to maintain a stable circuit within the range of variation of the transmission medium usually encountered. The minimum net low required for a stable circuit requires that the power delivered to the listener must be less than the lineup power by at least the loss of a hybrid (4 db). With this minimum loss and the permissible gain in each direction the system would have a zero stability margin. In order to provide the margin required for the usual circuit instabilities in long circuits an overall loss greater than minimum must be provided. The net loss or gain required from the minimum talker volume applied to the preferred listening volume delivered at the receiver depends upon the relative conversion efficiency of the transmitting and receiving transducers located in telephones 26 and 27. If the receiving sensitivity is such that more power is required than that delivered by the transmitting transducer for a minimum sound pressure talker the lineup volume and loss must be increased until the desired loss margin is introduced to deliver preferred volume or less and provide stability margin. It has been the practice to provide preferred listening volume and the necessary gain margin when a mean volume talker is applied.

Mean loss of long distance two-wire-four-wire circuits in the Bell System is 16 db with a standard deviation of 4.7 db. With this mean loss in either direction the loss is made up of 4 db for hybrid 20 and 21 at either end and 8 db loss in the four-wire path. The loss around the loop is then 4 db for the near hybrid 20 plus 4 db for the distant hybrid 21 and 8 db in each direction for a total of 24 db loss around the return loss path. This then represents the maximum gain increase around the return loss path which could be tolerated without circuit instability. The transmisison of the net loss stability is indicated by the standard deviation of the distribution of circuit losses. The standard deviation for long haul communication circuits in the Bell system as indicated above is 4.7 db in either direction of transmission. Extending the measurements to represent the transmission variations, both gains and losses, around the two-wire-four-wire path, the variations one way must be multiplied by the square root of two. The total departure of the regulating system is the direction of reduced loss (gain) is $$4.7\times1.4\times3=20 \text{ db}$$

The minimum margin of stability is then 24−20=4 db.

In four-wire operation with the same net loss in either direction the return loss is much larger since the loss from the receiver input to the transmitting transducer output is many db larger than the minimum hybrid loss of 4 db. This increase in loop loss makes it possible to reduce the net loss from end to end for the same transmission stability and deliver preferred listening volume for a lower applied volume. The necessary gain to raise the volume of a lower volume talker to deliver preferred listening volume can be added at the transmitter.

In operation of the usual two-wire-four-wire transmission circuit shown in FIG. 2, a talker speaks into the receiver transducer which is an inherent part of telephone 26. The speech is converted into its respective electrical signal and is fed to hybrid 20. Hybrid 20 has connected thereto compromise balance network 24. Hybrid 20 and associated compromise balance network 24 are conventional in the telephone art and are universally utilized by the Bell Telephone System. The electrical signal representative of speech is transmitted along lines 28, 28$^1$ to terminals A and B, respectively. There is also shown terminals C and D connected to lines 29 and 29$^1$, respectively. The unidirectional circuit shown in FIG. 3 which is incorporated into FIG. 2 is shown having input terminals $A^1$ and $B^1$ and output terminals $C^1$ and $D^1$. The terminals A and B of FIG. 2 are connected to terminals $A^1$ and $B^1$ respectively, of FIG. 3 and terminals C and D of FIG. 2 are connected to terminals $C^1$ and $D^1$ respectively, of FIG. 3.

The electrical signal representative of speech is then transmitted by way of compressor 40, transmission medium 41 and expander 42 to lines 29 and 29$^1$ to receiving attenuator pad 24 to hybrid 21 and to telephone 27. Hybrid 21 has associated with it compromise balance network 25. Hybrid 21 and its associated compromise balance network 25 are identical to their counterparts hybrid 20 and compromise balance network 24. A transducer inherent in telephone 27 converts the electrical signal into its representative speech. A second talker can then respond by talking into a transducer which is an inherent part of telephone 27. The receiving transducer at telephone 27 converts this speech into its representative electrical signal for transmission by way of hybrid 21 to lines 30 and 30$^1$ which are connected to terminals $A^{11}$ and $B^{11}$, respectively. The unidirectional circuit as shown in FIG. 3 is incorporated again in FIG. 2 so that terminals $A^{11}$ and $B^{11}$ of FIG. 2 are connected to terminals $A^1$ and $B^1$, respectively, of FIG. 3 and terminals $C^{11}$ and $D^{11}$ of FIG. 2 are connected to terminals C and D, respectively, of FIG. 3. Thus the electrical signals on lines 30 and 30$^1$ are transmitted by way of compressor 40, transmission medium 41 and expander 42 to lines 31 and 31[1] to hybrid coil 20 and telephone 26. Telephone 26 contains an output transducer to convert signals to its representative speech.

Figure 3:
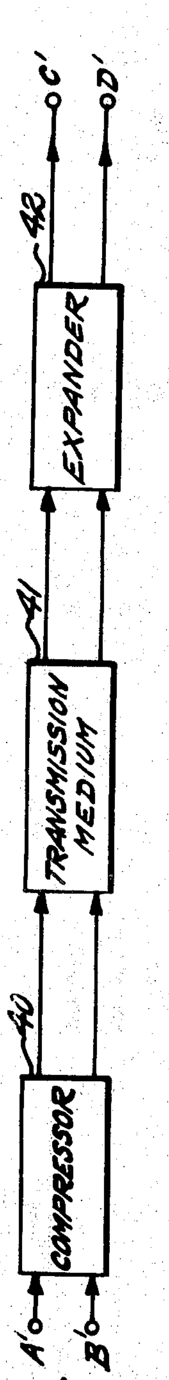
FIG. 3 shows a block diagram with unidirectional circuits including a compressor and expander for incorporation in either direction in the transmission circuit of FIG. 2.

Thus, the usual two-wire-four-wire arrangement is shown in FIG. 2 with unidirectional circuits including compressor 40 and expander 42 of FIG. 3 connected for transmission in either direction. The compression and expansion characteristics are usually limited to modest compression and expansion by the nonlinear performance of the control elements. The amount of usable compression has also been limited by the transmission instability of the two-wire-four-wire medium. The necessary gain to increase the volume for modest compression of the low volume talkers is usually obtained by the inherent gain of the compressor. The expander at the receiving end introduces loss to compensate for the added gain at the transmitting end of the system provided the transmission medium net loss remains unchanged and that the expander response complements the change introduced by the compressor. If the net loss is not stable, the expander aggravates or increases the variability by the expansion ratio. This increases the stability margin required.

Figure 4:
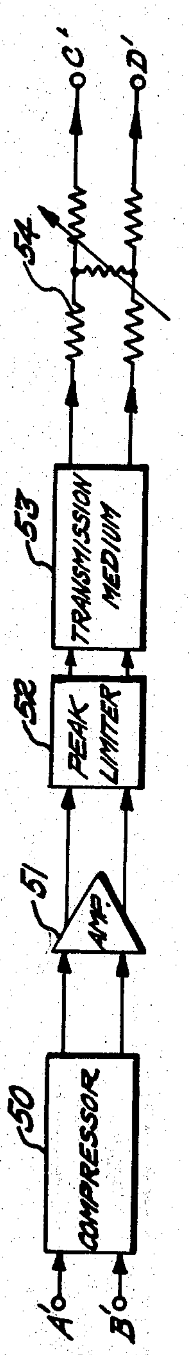
FIG. 4 shows a second circuit for incorporation into the transmission circuit of FIG. 2.

Thus, this invention rearranges the circuit's elements to improve the transmission stability and to eliminate the requirement for a receiving expander to hold the net loss nearly constant. The one way circuits shown in FIG. 4 are substituted for FIG. 3 in either direction as described for FIG. 3. This arrangement removes and replaces the receiving expander by fixed pad 54 connected at the receiving hybrid 21. The value of the pad is fixed to nullify the added gain required to raise the lineup volume to the desired transmission volume. In order to have a stable circuit it is necessary that compressor 50 be designed to have a fixed maximum gain for a minimum volume input or as specified for lineup volume and the compressor gain must decrease as the applied volume is increased.

Compressor 50 can be of the usual type which depends upon the nonlinear characteristic of the control element, a backward or forward acting regulator acting upon the power present in the output or input of the unit or one of the more recent type proposed by Dr. Thomas G. Stockham. The transmission circuit must be adjusted to be stable for maximum gain (low signal volume) and all higher volumes must be controlled by introducing loss to maintain the desired output. The preferred compressor and expander of Dr. Stockham provides a ready means to obtain any compression or expansion ratio since the compressor and expander characteristic depends upon the loss frequency characteristic of a passive network, to complement each other.

A compressor circuit and a companion expander circuit was disclosed by Dr. Thomas G. Stockham, Jr., of Lincoln Laboratory, in a paper entitled "The Application of Generalized Linearity to Automatic Gain Control," published in the 1967 conference notes on Speech Communication and Processing and presented at MIT Kresge Auditorium Nov. 8, 1967. A characteristic of this unit is to increase the loss (decrease gain) as the input power increases to maintain a nearly constant, or as desired, output. A compressor 50 of this type is shown in FIG. 4 followed by amplifier 51 if required which increases the low volume signal or the lineup signal to the desired volume for transmission. The regulated volume signal is peak limited in peak limiter 52 immediately following transmitting amplifier 51 to remove all peaks of the signal which exceed the RMS signal more than a given amount. Receiving pad 54 must be adjusted to nullify the effect of the increased gain at low volumes at the transmitting terminal.

The desired volume applied to transmission medium 53 is then maintained at the design value by inserting loss as a result of the action of compressor 50. The circuit disclosed can be arranged to hold the volume applied to the transmission circuit constant or reduce the applied variations by any desired factor, and thus, maintain the desired power to the transmission medium at all times when present. The stability of the received signal in FIG. 4 depends upon the stability of the applied regulated volume and the transmission stability of the medium as with the conventional arrangement of FIG. 3 except for the effect of the receiving expander. The volume applied to transmission medium 53 is adjusted by the auxiliary transmitting amplifier 51 shown to meet the intermodulation requirement of the system.

Figure 5:
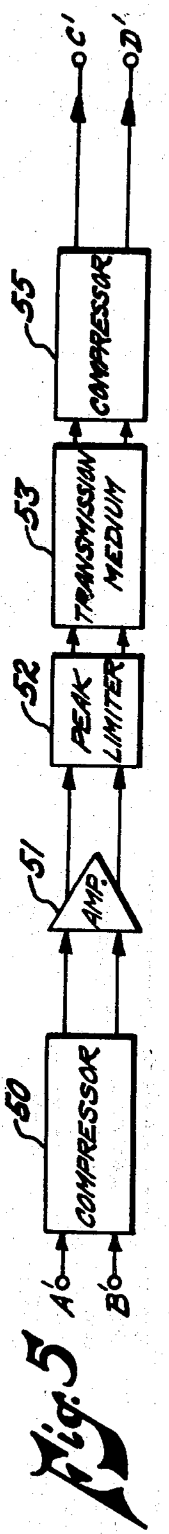
FIG. 5 shows a third circuit for incorporation into the transmission circuit of FIG. 2.
Figure 6:
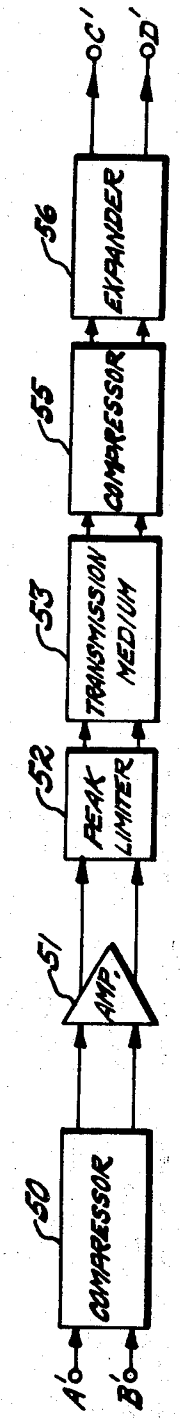
FIG. 6 shows a fourth circuit for incorporation into the transmission circuit of FIG. 2.
Figure 7:
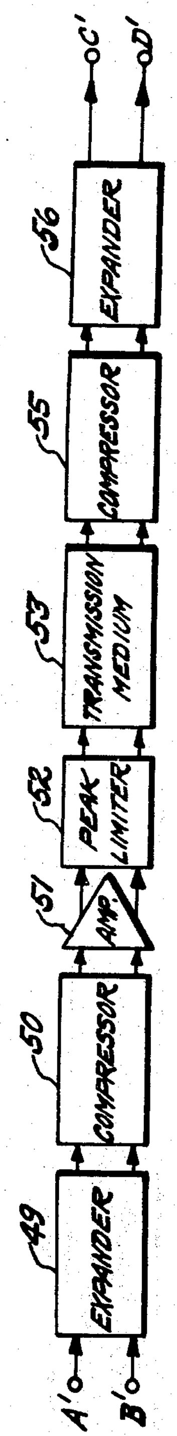
FIG. 7 shows a fifth circuit for incorporation into the transmission circuit of FIG. 2.

In order to reduce the ratio of peak to RMS of applied voltages, peak limiter 52 is shown in FIG. 4 and the other FIGS. 5, 6 and 7 following after the auxiliary transmitting amplifier 51. The amount of peak limiting used will be approximately the same for all talkers since the volumes are regulated. The purpose of maintaining a minimum peak signal voltage is to reduce the intermodulation requirements. The principle third order modulation produce which falls within the signal band is reduced. Further, third order difference modulation produces, when the channel is transmitted over a multichannel carrier system which falls into adjacent channels is reduced. The application of volume compressors and peak limiting reduces the modulation requirement on transmitting amplifiers and regulators in the carrier transmission circuits.

If in addition to the equipment shown in FIG. 4, receiving compressor 55 is added, we obtain the circuit shown in FIG. 5 (which is incorporated in FIG. 2, as described for FIGS. 3 and 4), in either direction. A portion of the transmission variation introduced in the medium can be reduced to deliver a more constant received volume. Compressor 55 is adjusted to receive a fixed minium or lineup volume from the medium. Any volume below the fixed volume will be delivered at the same or lower volumes. Any volume above the fixed volume will be reduced by the loss inserted by the compressor to deliver a more nearly constant volume or reduced range of volumes as the applied volume at the receiver terminal is increased due to a decrease in net loss (gain).

An expander 56 can be added as shown in FIG. 6 to increase the transmission gain as the loss increases, receiving volume drops, in the medium with a signal present and vice versa. The relative gain increase should be less than the increase in loss to maintain approximately a constant overall loss. When the signal input drops below the minimum expected value the loss increases in the expander for still lower or no signal inputs and thus, maintaining a stability margin as required.

The combination of receiving compresor loss and expander loss or gain change maintains the required stability margin for all transmission gain or loss to make it possible to adjust the net loss for a given stability margin to a lower net loss. The mean net loss from the sending office to the subscriber in the Bell System two-wire-four-wire circuits is 16 db. The loop loss in these circuits is then made up of 4 db in each hybrid plus 8 db loss in each direction of the four-wire circuit. The loss around the return loss path or loop is $8\times2+4\times2=24$ db. A decerase in net loss of three times the standard deviation times the square root of 2 indicates a decrease in net loss of $4.7\times3\times2^{1/2}=20$ db which is introduced at the extreme. The margin against instability is then $24.0-20=4.0$ db around the loop. Now if this variation is reduced by the receiving compressor and expander gain is less than the compression say by a difference of 6 db, the net loss can be reduced in either direction to 10 db or less instead of 16 db as at present.

In order to illustrate the action of receiving compressor 55 and expander 56 consider the elements shown in FIG. 6. A range of operation from 0 to $-60$ db is to be applied at the receiving compressor 55. If the variation of the one way circuit is to be reduced by attenuating the receiving signal as the net loss drops (gain increases), the gain can be increased about 14.0 db, since the compressor 55 and expander 56 are arranged to introduce loss as the signal amplitude increases. If an increase of power of 48 db was expected no attenuation would be introduced at −60 db to have a −12 dbm. output. Any increase in volume at the compressor input would be attenuated by the action of the 5:1 compressor and 2:1 expander for a total reduction of 2.5:1. Thus, for an increase of 14 db from −60 dbm., the loss would be increased by 11.2 db or the gain increase is held to 2.8 db. This means that the increased gain in the loop circuits is limited to about $2.8 \times 2^{1/4} = 4.0$, now a margin of 24 db was provided and since a loss has been added to compensate for the increase in power output a portion of the gain increases has been nullified to reduce the margin required.

The 9 db loss added by the compressor and expander reduces the margin which must be provided in the two-wire-four-wire circuit. The expander 56 added at the output 70 of FIG. 6 or expander 49 added at the input of FIG. 7 should approach as closely as possible a constant using a low ratio expander, and as the input drops below operating ranges the loss introduced by the expander increases to maintain the necessary margins.

Thus an analog voice transmission system design which regulates all applied telephone volumes to a constant volume, or as desired, is made possible by specifying the relative response of the telephone to a minimum sound pressure to deliver a higher volume than preferred listening volume at the receiver input. With telephone sets meeting this requirement, it is possible to transmit all talkers at increased volume and regulate the volumes. Means are also disclosed whereby the volume delivered from a talker sound pressure and a telephone set can be regulated to constant or as required volume for transmission over circuits to the desired listener. The volume can be adjusted to apply the desired design power at the transmitting terminal input. The received signal can be at or near a constant volume for variations introduced in the medium or a receiving compressor can be added to deliver approximately contant volume to the intended listener. Still further means are disclosed whereby the volume applied to transmission circuits can be regulated to constant or rising volume as desired for transmission to the distant listener. This volume can be adjusted to drive or deliver the design power at the circuit input. The received signal after transmission will be at or near a constant or rising volume. The signal at the receiving terminal can be compressed to remove all or part of the variations introduced in the medium to deliver a constant or reduced volume range to the listening circuit.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may be used to advantage without a corresponding use of the other features.

Having now described my invention, what I claim as new and desire to secure by Letters Patent is as follows:

1. Analog voice signal processing apparatus in a long haul transmission system having a predetermined lineup volume comprising a first telephone to convert speech into first representative electrical signals, a first hybrid network receiving said first representative electrical signals, a first balancing network associated with said first hybrid network, a first compressor receiving said first representative electrical signal from said first hybrid network, said first compressor having a fixed maximum gain for a minimum volume input in accordance with said predetermined lineup volume and said first compressor simultaneously having a characteristic of increasing the loss on the input power increase to maintain a nearly constant output, a first amplifier receiving the output from said first compressor, said first amplifier raising the gain of the signal for subsequent transmission, a first peak limiter receiving a signal from said first amplifier, said first peak limiter removing all peaks of the signal exceeding the RMS signal more than a given amount, a first transmission medium receiving a signal for long haul transmission from said first peak limiter, a first attenuator network receiving a signal from said first transmission medium, said first attenuator being adjusted to nullify increased gain to maintain said predetermined lineup volume, a second hybrid network receiving a signal from said first attenuator network, a second balancing network associated with said second hybrid network, a second telephone for receiving a signal from said second hybrid for conversion to speech.

2. Analog voice signal processing apparatus as described in claim 1 further including a second compressor identical to said first compressor, said second compressor receiving a second electrical signal representative of speech from said second telephone by way of said second hybrid network, a second amplifier identical to said first amplifier, a second peak limiter identical to said first peak limiter, said second amplifier and second limiter being in a second series relationship, a second transmission medium identical to said first transmission medium wth said second series arrangement interconnecting said second hybrid network and said second transmission medium, and a second attenuator network identical to said first attenuator network, said second attenuator network interconnecting said first hybrid network and said second transmission medium.

3. Analog voice signal processing apparatus in a long haul transmission system having a predetermined lineup volume to be retained constantly comprising a first telephone to convert speech into first representative electrical signals, a first hybrid network receiving said first representative electrical signals, a first balancing network associated with said first hybrid network, a first compressor receiving said first representative electrical signals from said first hybrid network, said first compressor having a fixed maximum gain for a minimum volume input in accordance with said predetermined lineup volume and said first compressor simultaneously having a characteristic of increasing the loss as the input power increases to maintain a nearly constant output, a first amplifier receiving the output from said first compressor, said first amplifier raising the gain of the signal for subsequent transmission, a first peak limiter removing all peaks of the signal exceeding the RMS signal more than a given amount to reduce intermodulation requirements, said first amplifier and said first peak limiter being in a first series arrangement, a first long haul transmission medium with said first series arrangement interconnecting said first compressor and said first transmission medium, a second compressor adjusted to receive a fixed minimum volume from said first transmission medium with any volume below said fixed minimum volume being delivered at the same or lowered volumes and any volume above said fixed minimum volume being reduced by the loss inserted by said second compressor to deliver a constant volume, a second hybrid network receiving a signal from said second compressor, a second balancing network associated with said second hybrid network, and a second telephone receiving a signal from said second hybrid network for conversion to representative speech.

4. Analog voice signal processing apparatus as described in claim 3 further including a first expander interconnected between said second compressor and said second hybrid network, said first expander operating to increase the transmission gain as the loss increases.

5. Analog voice signal processing apparatus as described in claim 4 further including a second expander interconnecting said first hybrid network and said first compressor, said second expander having a low ratio characteristic so that as the input drops below the operating ranges the loss introduced thereby increases to maintain said predetermined lineup volume.

References Cited

UNITED STATES PATENTS

| | | | |
|---|---|---|---|
| 2,137,472 | 9/1939 | Doba | 179—100.3 |
| 2,825,764 | 3/1958 | Edwards et al. | 179—170.2 |
| 3,229,038 | 1/1966 | Richter | 179—1 |
| 3,458,815 | 7/1969 | Becker | 325—62 |

WILLIAM C. COOPER, Primary Examiner

C. W. JIRAUCH, Assistant Examiner

U.S. Cl. X.R.

333—14; 325—62